Patented Feb. 16, 1932

1,845,977

UNITED STATES PATENT OFFICE

ROBERT E. FULLER, OF WOBURN, MASSACHUSETTS, ASSIGNOR TO FULLER SYSTEM INC., OF WOBURN, MASSACHUSETTS, A CORPORATION OF MASSACHUSETTS

METHOD FOR EXTERMINATING INSECT PESTS

No Drawing.   Application filed December 1, 1930.   Serial No. 499,413.

This invention relates to insecticides and methods of applying the same, being more particularly concerned with the method of preparing and applying a fumigant adapted especially for greenhouses and effective in exterminating all the most troublesome greenhouse pests.

Among the insect pests which infest a greenhouse and are the occasion of serious damage to the plants grown therein are a number, such as the red spider and the cyclamen mite, for which no satisfactory methods of extermination have heretofore been found. The methods heretofore employed have resulted only in a temporary check of, and a slight or partial control in, the inroads of these pests, without the effective extermination of the insect pest itself.

Ordinary insecticide poisons depend on relatively quick action, and in the case of insects having dermal respiration, such as the red spider and cyclamen mite, the process of absorbing the poison appears to be too slow to have any material killing effect.

I have found that through the employement of a fumigant properly selected from coal tar derivatives and properly applied through steps which are hereinafter described, the red spider, cyclamen mite, as well as numerous others of the principal insect pests which affect greenhouse plants, such as the midge, thrip, white fly, green fly, leaf roller, and many others, may be effectively destroyed by killing without injury to the plants, leaving the latter free to express themselves in healthier and more beautiful growth and permitting the plant foliage and blossoms to retain their natural color and texture, due to the fact that no insect pests remain present.

By this process the insects are kept surrounded by a fumigating atmosphere of such a nature and for such a prolonged period of time that an absorption by the insect of the killing agent is assured, this apparently acting, in the case of such insects as the red spider and cyclamen mite, by a slow, gradual absorption of the killing agent through the pores of the body, resulting in ultimate paralysis and death.

The application of the fumigant, however, unless carefully safeguarded and carried out is apt to result in serious damage to the plant life itself. By long experimentation I have found that to insure the continued good condition of the plants, which is of equal importance to the destruction of the insect pests, conditions in the fumigating atmosphere must be very carefully balanced and controlled to prevent burning, bleaching or other damage to the plants themselves. To secure this object it is not only necessary that certain conditions with respect to humidity and temperature be preserved in the space to be fumigated, but equally important that the evaporation of the fumigant be so controlled and the sources thereof be so distributed throughout the space that in no part thereof can a fumigating atmosphere be generated harmful to the plants. I have furthermore found that the plants are capable of withstanding the fumigating action without damage only for a limited period, after which a period of recuperation should be provided before continuing further fumigation, the period of fumigation being carried out for a sufficient period to develop the full killing effect of the fumigant but stopped before any damage to the plants can result.

The invention will be best understood by reference to the following description of the nature of the fumigant and the steps which are followed in applying it, while its scope will be more particularly pointed out in the appended claims.

For the fumigant I preferably employ coal tar derivatives. The fumigant may consist of naphthalene alone, or it may be composed of naphthalene as the base but mixed with some other coal tar derivative which has a greater toxic or killing effect on the insect pests than naphthalene alone. The latter, for example, may be any one of several of the benzine group, such as para-dichlor benzine, ortho-dichlor benzine or tri-chlor benzine, preference being had for para-dichlor benzine. These coal tar derivatives, having greater toxic properties than naphthalene, if used alone, however, create a fumigating atmosphere of such a concentrated nature that it tends to damage the foliage or blossoms of the plants themselves. Accordingly, when such a substance is employed, I prefer to mix with a relatively small proportion thereof, a relatively large proportion of naphthalene, thereby supplying through the latter the necessary density of atmosphere which is required for effective application and providing a proper balance through which extermination of the insects is secured without injury to the plants.

In preparing the mixed or combined form of fumigant, naphthalene, in crystaline form, is preferably mixed with para-dichlor benzine, also in crystalline form. If a liquid coal tar derivative, such as ortho-dichlor benzine, is employed with the naphthalene, the mixture may be melted down and molded into cakes for convenient use. The proportions employed may be varied within rather wide limits, but the mixture is preferably made up of approximately 75% to 90% by weight of naphthalene and 25% to 10% by weight of para-dichlor benzine. I have found that good results are secured by employing about 85% by weight of naphthalene and 15% by weight of para-dichlor benzine. If another of the benzine group is employed for its greater toxic effect, substantially the same proportions should be followed as in the case of para-dichlor benzine. In place of either one of the substances, such as para-dichlor benzine or ortho-dichlor benzine alone, two or more may be used in conjunction with each other, the aggregate proportions of the two being the same as the proportion of either one when used alone.

In applying the fumigant certain conditions, especially with respect to temperature and humidity maintained within the greenhouse, the amount of fumigant employed and the rate at which it is vaporized should be observed.

Before starting fumigation, the greenhouse space to be fumigated should be hermetically closed so far as practicable by shutting all ventilators and doors prior to starting fumigation and cutting off drafts and outside air by closing up broken window panes or other openings.

A moist condition of the atmosphere of the greenhouse is necessary to develop the killing effect of the fumigant and a humid atmosphere also tends to protect the plants from burning both from the effects of fumigant and from any excessively high temperature. Accordingly a humidity preferably of from 80% to 90% should be provided and maintained. The walks, beds, benches, pots and flats may be preliminarily moistened by wetting, but care should be taken to avoid sprinkling or wetting the foliage on the plants themselves as otherwise injury may result to the plants in the absence of air during fumigation, although certain plants, such as roses, carnations and cyclamen are benefited rather than damaged by previous light spraying. To be sure of securing the required atmospheric humidity it is well to water the walks, benches, beds, pots and flats the day before fumigating, and, after the greenhouse has been shut up preparatory to fumigating, to add such moisture to the objects named as will assure a maintenance of a humidity within the range named, as measured by a hygrometer. It is especially important that the soil in which the plants are growing should be thoroughly wet since I have found that, irrespective of the humidity maintained in the surrounding atmosphere, the plants are susceptible to damage from the fumigant if the surrounding soil has not sufficient moisture.

It is also necessary that such a temperature be maintained throughout the greenhouse atmosphere during the process of fumigation that the fumigant will remain in a gaseous state and without danger of condensation in crystalline form on the plants which, if it occurs, tends to burn or otherwise damage the stems, leaves or flowers thereof.

Condensation will take place at different temperatures, dependent on whether there is employed the naphthalene alone or naphthalene mixed with one of the other substances mentioned, and dependent also to some extent on the density of the fumigating atmosphere due to the amount of fumigant evaporated and the rate of evaporation. The condensing temperature in the case of naphthalene is somewhat higher than that of para-dichlor and ortho-dichlor benzine, or that of a mixture of naphthalene with para-dichlor or ortho-dichlor benzine, but, with the amount of fumigant and the rate of evaporation hereinafter recommended, and to provide a suitable margin of safety to meet sudden external temperature changes, the temperature of the greenhouse space during fumigation should preferably be kept above a temperature of approximately 75° to 77° Fah., and in no case should be permitted to fall below a temperature of 70° Fah. In cool weather, or whenever it is required, artificial heat should be supplied, if necessary, to maintain the temperature within the indicated range. The temperature of the greenhouse space during fumigation should also be kept below 100° Fah., although the upper limit of temperature is not so important. With the absence of air, however, the plants become susceptible to heat and tend to burn under excessive heat, so that the temperature should preferably be kept below 100° Fah. and if practicable not greater than 95° Fah. In hot weather the temperature may be kept within the upper limit of the range mentioned, that is, below 100° Fah., by starting the fumigation late in the afternoon and continuing it during the early hours of the night, thereby avoiding an excessive amount of heat, The fumigant prepared as described is vaporized by any suitable means. For this purpose the substance may be placed in a shallow pan and heated by a lamp or stove capable of vaporizing from 3 to 4 ounces an hour of the fumigant without boiling the material. A convenient form of heater may be made by applying to an ordinary lamp burner a metal sleeve or chimney having ventilating openings at the top and bottom, on which sleeve a pan containing the fumigant may be placed. The burner should be run without smoking.

The permissible period during which fumigation may be continued varies somewhat with different plants. The action of the fumigant on the insect pests is at first very slow and its killing effect is not developed until after about three hours' time, after which it increases rapidly during the next two or three hours. Some hardy varieties of greenhouse plants may be capable of withstanding the action of the fumigant without injury for longer periods than others, but for the usual mixed variety of plants which comprise the staple product of most greenhouses, in order to insure maintaining the plants in good condition, it is advisable to limit the period of continuous fumigation to approximately six hours, and in no case to exceed nine hours in length, after which the greenhouse space should be opened to permit access of air to the plants and to provide a period of recuperation therefor. Six hours' fumigation, however, is insufficient to completely exterminate many insect pests, so that, after a suitable interval of recuperation has been permitted the plants, the same process may be again repeated, preferably on successive days if possible. By way of example, positive results have been had by running the fumigation over a period of approximately six hours in one day and repeating the same process three days in succession.

The permissible strength of the fumigating atmosphere which may be maintained and the rate at which the evaporation of the fumigant should be carried on during the six hour or other period adopted will also vary with different plants, some hardy varieties being capable of withstanding the action of the fumigating atmosphere for longer periods than more delicate ones.

The rate of evaporation necessary to maintain a given density of atmosphere will also vary with the tightness of the greenhouse. For a tight, modern house a lesser rate of evaporation will suffice than in the case of a loosely constructed house, with more or less air leakage.

In the case of the average greenhouse containing the average variety of plants a suitable fumigating atmosphere may be had by carrying on a continuous and substantially uniform evaporation of the stronger combined fumigant at the rate of from 1/3 to 1/2 ounce of fumigant per 1000 cubic feet of space per hour, or, in other words, the evaporation of from 2 to 3 ounces of fumigant per 1000 cubic feet of space during a six hour period, if the latter is adopted. If naphthalene alone is employed, a larger proportion should be used, varying from 2/3 of an ounce to 1 ounce per 1000 cubic feet of space per hour. The strength of the fumigating atmosphere should be such that there is a slight, but not an excessive, smarting of the eyes of the operator. It is preferable, however, to employ a lesser amount than an application which is too strong, and in no case should the evaporation be carried on at a rate of more than 1 ounce of fumigant per 1000 cubic feet of space per hour in the case of the combined fumigant or 2 ounces per 1000 cubic feet per hour in the case of naphthalene alone.

It is important that there should be a substantially uniform diffusion of the evaporated fumigant generated at the sources of evaporation and that the amount of fumigant evaporated at any one point in the greenhouse and the conditions under which it is evaporated shall not be such as to create an atmosphere of such localized density as to be damaging to the plants.

To secure these conditions it is desirable that a sufficient number of heaters should be employed, suitably distributed throughout the greenhouse, and each heater called on to evaporate but a limited amount of the fumigant, and furthermore that the fumigant should be evaporated with substantial uniformity during the period of fumigation and without the application of excessive heat.

Best results are had by providing for evaporation at each separate source at a rate approximating from 1½ to 3 ounces per hour for the combined fumigant and from 3 to 6 ounces per hour for the naphthalene alone. This rate may be increased somewhat without damage to the plants but should not be allowed in any case to exceed 6 ounces per hour for the combined fumigant or 12 ounces per hour for the naphthalene alone. A sufficient distribution of the sources of evaporation accordingly may be had, in the case of the combined fumigant to be evaporated at the rates recommended, if there is employed one heater for approximately each 7000 cubic feet of greenhouse space, and these should be distributed as nearly uniformly as practicable throughout the greenhouse. For a greenhouse having 85,000 cubic feet, for example, from nine to twelve heaters should preferably be used. When the total amount of fumigant to be employed has been determined, it may then be divided equally into portions corresponding to the number of heaters used, so that an excessive rate of evaporation will not be carried on at any one source.

The rate of evaporation at each heater, furthermore, should be as nearly uniform as possible through the entire fumigating period and the fumigant should be evaporated by a relatively gentle heat, sufficient to cause it to melt and evaporate but without boiling. I have discovered that if the fumigant is evaporated through temperature which are reached at and above the boiling point, a fumigating atmosphere is created which, though not visibly different, tends to burn or otherwise damage the adjacent plants.

As the preferred method of carrying out this process I may illustrate by the following specific example which assumes an average variety of greenhouse plants.

Having closed the greenhouse space, as previously described, not less than one hour before starting fumigation, and having brought the humidity of the greenhouse atmosphere to the point where the hygrometer shows not less than 80% humidity and the temperature not less than 75° Fah., and having wet the soil about the plants to assure a sufficient moisture therein, fumigation may be started. Provided the temperature is kept within the limits previously specified, the fumigation may be carried out in the daytime, in the sunlight or at night. Having ascertained the cubical content of the greenhouse to be fumigated, an amount of the combined fumigant, comprising naphthalene and para-dichlor benzine in the proportions named, is weighed out representing between 2 and 3 ounces for each 1000 cubic feet of greenhouse space, dependent on the tightness of the house. If fumigation is to be continued for a period of six hours, which for practical purposes has been found approximately the best, the total amount of fumigant selected is divided into six equal parts, and one of the six parts distributed equally among the evaporating pans on the heaters or stoves, the number of the latter having been determined as above described. The flame of the heater is then adjusted high enough to melt the fumigant in the evaporating pan and vaporize all the liquid in the course of one hour, but should be carefully watched and the flame of the heater readjusted from time to time, if necessary, to see that no boiling of the liquid at any time takes place. At the end of each house the same amount of fumigant is added to the evaporating pan of each heater, the latter being carefully watched so that it will not evaporate more than the total amount in less than the assigned time, it being preferable to have some of the fumigant left over at the end of the hour than to evaporate it too rapidly. The assigned amount of fumigant is therefore uniformly evaporated over the six hour period.

At the end of six hours the heaters are extinguished and the greenhouse ventilators opened to thoroughly ventilate the house and to air the plants and provide an interval of recuperation therefor. In the case of the more resistant plants, such as carnations, cyclamen, roses, begonias, etc., before airing the plants, the ventilators may be kept closed for an interval of several hours. On the next day the same process should be repeated, and after a similar interval of recuperation, it should be again repeated on the third consecutive day.

The process applied as described will result in the extermination of red spider and cyclamen mite, for which no methods of extermination have heretofore been found, as well as destroying other insect pests. So far as has been found, no ordinary greenhouse plants have been damaged by this process if carried out with the precautions described, with the exception of mignonette, rambler roses and forced potted roses, some varieties of chrysanthemums and orchids, which should not be subjected to this fumigation. In the case of roses, in order to avoid any bleaching, it may be desirable to allow two or three days to elapse before repeating successive fumigations. And in the case of chrysanthemums it is advisable to reduce the amount of fumigant to about 50% of the normal amount, and to allow one or two days to intervene between fumigations. It is also desirable in the case of chrysanthemums to spray the plants with water after fumigation has been completed.

While I have herein described in detail the steps which may be followed in carrying out my process in the preferred form, it is to be understood that these may be varied in wide degree without departing from the spirit of the invention, the essential features of which are set forth in the appended claims.

1. The method of destroying by fumigation red spider, cyclamen mites and other insect pests on growing plants, which consists in closing the space containing the plants, wetting the soil in which the plants are growing, maintaining the atmosphere in the space during fumigation at not less than 80% humidity and at a temperature between 70° and 100° Fah., providing a fumigant comprising naphthalene mixed with a materially lesser proportion of para-dichlor benzine, evaporating the fumigant without boiling to cause a substantially uniform evaporation thereof at a rate of between $\frac{1}{3}$ and $\frac{1}{2}$ ounce per hour for each 1000 cubic feet of space, limiting the evaporation at any one source of evaporation to a rate of from $1\frac{1}{2}$ to 3 ounces per hour, continuing evaporation for a period of approximately six hours, stopping the evaporation, and thereafter ventilating the space.

2. The method of destroying by fumigation insect pests on growing plants, which consists in closing the space containing the plants, maintaining the atmosphere of the space during fumigation at not less than 80% humidity and at a temperature of not less than 70° Fah., and not so high as to permanently injure the plants, providing a fumigant containing naphthalene mixed with a materially lesser proportion by weight of a coal tar derivative having a greater toxic effect than naphthalene, evaporating the fumigant without boiling to cause a substantially uniform evaporation thereof at a rate not exceeding 1 ounce per hour for each 1000 cubic feet of space, limiting the evaporation at any one source of evaporation to a rate not exceeding 6 ounces per hour, continuing evaporation for a period not exceeding nine hours, stopping evaporation, and thereafter ventilating the space.

3. The method of destroying by fumigation insect pests on growing plants, which consists in closing the space containing the plants, maintaining the atmosphere of the space during fumigation at not less than 80% humidity and at a temperature not less than 70° Fah. and not so high as to permanently injure the plants, providing a fumigant comprising naphthalene, selecting a quantity of such fumigant, sub-dividing it into substantially equal portions, distributing it to separate sources of evaporation in said space, heating it without boiling to cause a substantially uniform evaporation at each of said sources at a rate not exceeding in the aggregate for all the said sources 2 ounces per hour for each 1000 cubic feet of space and not exceeding at any one source a rate of evaporation of more than 12 ounces per hour, continuing said evaporation for a period not exceeding nine hours, and thereafter ventilating the space.

4. The method of destroying by fumigation insect pests on growing plants, which consists in closing the space containing the plants, maintaining the atmosphere of the space during fumigation at not less than 80% humidity and at a temperature not less than 70° Fah. and not so high as to permanently injure the plants, providing a fumigant comprising naphthalene, heating the fumigant without boiling to cause a substantially uniform evaporation thereof at a rate not exceeding 2 ounces per hour for each 1000 cubic feet of space and causing a substantially uniform diffusion of the evaporated fumigant throughout said space, continuing said evaporation for a period not exceeding nine hours, stopping fumigation, and thereafter ventilating the space.

In testimony whereof, I have signed my name to this specification.

ROBERT E. FULLER.